United States Patent [19]

Fisher et al.

[11] Patent Number: 5,086,445
[45] Date of Patent: Feb. 4, 1992

[54] METHOD AND APPARATUS FOR REFERENCING A CASSETTE AND/OR AN INTENSIFYING SCREEN ON A RADIOGRAPH

[75] Inventors: Edwin W. Fisher, Elkton, Md.; Christopher Schreiber, Ridley Park, Pa.; Douglas R. Walker, Wilmington, Del.

[73] Assignee: E. I. Du Pont de Nemours and Company, Wilmington, Del.

[21] Appl. No.: 581,998

[22] Filed: Sep. 13, 1990

[51] Int. Cl.⁵ .............................. G03B 42/04
[52] U.S. Cl. .................... 378/165; 378/166; 378/185
[58] Field of Search ............... 378/165, 166, 162, 182, 378/185

[56] References Cited

U.S. PATENT DOCUMENTS

| | | | |
|---|---|---|---|
| 2,286,748 | 6/1942 | Martin | 378/165 |
| 3,221,620 | 12/1965 | Sano et al. | 95/1.1 |
| 3,291,983 | 12/1966 | Landau | 378/23 |
| 3,619,611 | 11/1971 | Hall | 250/67 |
| 3,643,358 | 2/1972 | Morderosian | 40/2.2 |
| 3,668,394 | 6/1972 | Panzer | 250/67 |
| 3,683,182 | 8/1972 | Farmer | 250/67 |
| 3,703,272 | 11/1972 | Lareau | 250/67 |
| 4,035,653 | 7/1977 | Karasko | 250/475 |
| 4,127,774 | 11/1978 | Gillen | 250/476 |
| 4,194,122 | 3/1980 | Mitchell et al. | 250/476 |
| 4,426,723 | 1/1984 | Rouse | 378/165 |
| 4,429,412 | 1/1984 | Pierce et al. | 378/165 |
| 4,506,676 | 3/1985 | Duska | 128/653 |
| 4,514,958 | 5/1985 | Hoorn | 53/266 |
| 4,529,635 | 7/1985 | Sheldon | 428/40 |
| 4,553,369 | 11/1985 | Debes et al. | 53/55 |
| 4,698,836 | 10/1987 | Minasian | 378/162 |
| 4,764,948 | 8/1988 | Hurwitz | 378/165 |
| 4,813,062 | 3/1989 | Gilpatrick | 378/162 |
| 4,836,682 | 6/1989 | Keenan, III | 356/445 |
| 4,953,193 | 8/1990 | Robinson | 378/162 |

Primary Examiner—Janice A. Howell
Assistant Examiner—David P. Porta
Attorney, Agent, or Firm—John E. Griffiths

[57] ABSTRACT

The present invention relates to a method and apparatus for imprinting information, particularly identifying an intensifying screen and cassette used to produce a radiograph, permanently on the radiograph.

6 Claims, 3 Drawing Sheets

METHOD AND APPARATUS FOR REFERENCING A CASSETTE AND/OR AN INTENSIFYING SCREEN ON A RADIOGRAPH

BACKGROUND OF THE INVENTION

1. Field of the Invention

This invention relates to a method and apparatus for imprinting information, particularly identifying an intensifying screen used to produce a radiograph, permanently on the radiograph.

2. Description of Related Art

Each day countless numbers of radiographs are generated for medical diagnostic purposes. A radiograph of a patient's body is normally taken by a X-ray technician and the radiograph is subsequently reviewed by a radiologist for interpretation and diagnosis. Of particular concern in the interpretation of the radiograph is determining if a specific portion on the radiograph is a true representation of the X-ray exposed area of the patient's body or an irregularity induced on the film. Irregularities on the film can interfere with or cause misinterpretation of the radiograph. There are many sources from which irregularities on the film can be induced. For example, irregularities on the film can be induced from equipment or people that handle or contact the film before, during or after development of the radiographic image.

In particular, irregularities on the film can be induced from the cassette and/or the intensifying screen(s) used during the film's exposure to X-ray radiation. The layers, e.g. protective, fluorescent, etc., of X-ray intensifying screens become dented, abraded and scratched in normal use by dust and dirt, etc., such that the screens deteriorate over time and impair the image quality on a radiograph. Dust strongly adheres to the screens due to pressure exerted during sandwiching of successive film sheets between the screens. Denting is caused by a particle being forced into the surface of the screen. Repeated insertion and withdrawal of X-ray film sheets from cassettes provided with X-ray intensifying screens and the shearing action which occurs during the closing of cassettes are the principal factors which cause the abrasion of the screen surface. Also, due to the moisture permeability of the protective layers of a screen, the screens may become stained with developer and lose efficiency by preventing radiation from reaching the X-ray film. Further, the cassette itself can be the cause for irregularities in a radiograph. Typically this occurs when the cassette loses the ability to maintain intimate contact of the screens with the film, for example, due to deterioration of parts of the cassette such as a foam backing or a latching mechanism.

It is useful for a radiologist to know which cassette, and thus which intensifying screen(s), was used to produce a particular radiograph. Since many cassettes are in use by X-ray technicians it is often times very difficult to determine which cassette was used for a particular radiograph in question. It is difficult and time consuming to visually inspect cassettes for causes for irregularities since the cassettes are typically loaded and unloaded in a darkroom or by automated film handling equipment.

If the identity of a particular cassette and/or intensifying screen were imprinted on the radiograph, the cassette could be easily traced and then visually checked against the radiograph by the radiologist or pulled from circulation to repair or replace the screen and/or cassette.

It is a long standing trend in radiology to permanently place patient identification data on a radiograph. Other kinds of information which are commonly permanently imprinted on the radiograph relate to the orientation of the film and/or the patient's body when exposed to the radiation, i.e., right or left views, anterior, oblique, etc.

One method for permanently imprinting information on a radiograph is by selectively blocking portions of an X-ray film with, for example, a lead blocker in the cassette during X-ray exposure by the standard film-screen technique. The identification data is later placed within the selectively blocked portions with an identification camera which slides the blocker from that region where it had previously occluded during the X-ray exposure and flash exposes the identification data from a card onto the previously unexposed area of the film. The entire X-ray film is then developed in a routine fashion, thus permanently capturing the patient anatomical image and the identification information on the radiograph.

Other methods use X-ray opaque materials, for example lead, mercury, etc., to permanently imprint a radiograph with information during the X-ray exposure. X-ray opaque objects, such as lead letters, are secured in place, typically with tape, on a cassette in an area which will not interfere with the resultant anatomical image of the radiograph, and X-ray exposed at the same time as the patient, so that the shadow of the letters will appear on the radiograph upon development.

Thus, these methods of permanently imprinting information on a radiograph selectively block the X-ray beams during exposure to either directly imprint the desired information on the radiograph or provide an unexposed area on the film for subsequent exposure by another source.

It is an object of this invention to provide a method for permanently imprinting on a radiograph the identification of an intensifying screen and/or cassette which was used to produce the radiograph during an X-ray exposure.

SUMMARY OF THE INVENTION

The present invention relates to an apparatus for producing a visible image on an X-ray film identifying an intensifying screen used to aid in the exposure of the X-ray film, the apparatus comprising:

at least one intensifying screen adapted to fluoresce when exposed to X-ray radiation; and means for identifying the intensifying screen on a radiogram exposed to X-ray radiation adjacent the screen.

The present invention further relates to a method for identifying an X-ray intensifying screen or cassette used to produce a radiograph comprising:

placing a label identifying the intensifying screen on the intensifying screen in the cassette, the label being at least partially opaque to light;

placing an X-ray film against the screen and the label;

exposing the screen, the label and the film to X-ray radiation; and developing the film to produce a visible image on the film of the label identifying the intensifying screen used.

The present invention is further directed to a method for identifying an X-ray intensifying screen used to produce a radiograph comprising:

placing a label identifying the intensifying screen on the intensifying screen, the label being at least partially opaque to light;

placing an X-ray film against the screen and the label;

exposing the screen, the label and the film to X-ray radiation causing the screen to fluoresce thereby generating light;

absorbing at least some of the light by the label in a unique pattern; and developing the film to produce a visible image on the film of the unique pattern identifying the intensifying screen used.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Figure 1:
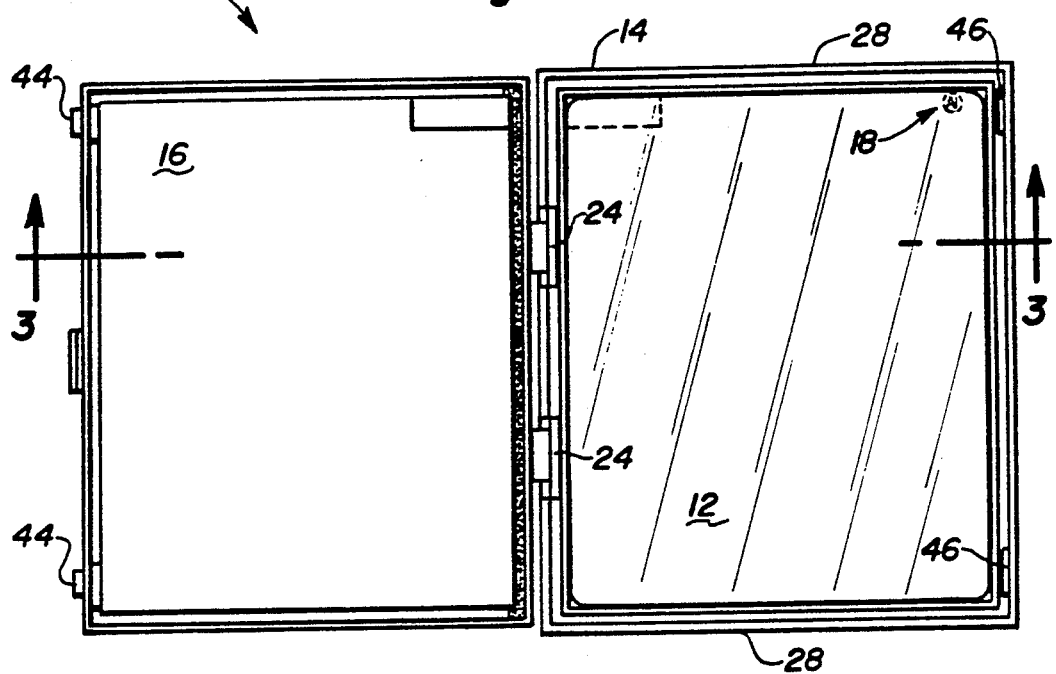
FIG. 1 depicts a plan view of a light tight X-ray cassette having intensifying screens with a label which is partially opaque to X-ray radiation attached to one of the screens in accordance with the present invention.

Throughout the following detailed description, similar reference characters refer to similar elements in all figures of the drawings.

Figure 3:
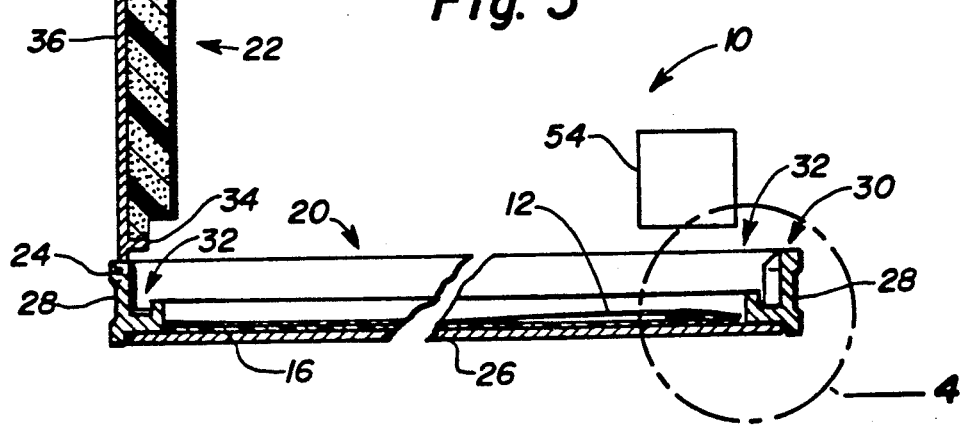
FIG. 3 is a cross sectional view through the cassette taken on line 3—3 of FIG. 1 taken in the direction of the arrows with the screens generally perpendicular to one another and the partially opaque label positioned under a sensor.
Figure 4:
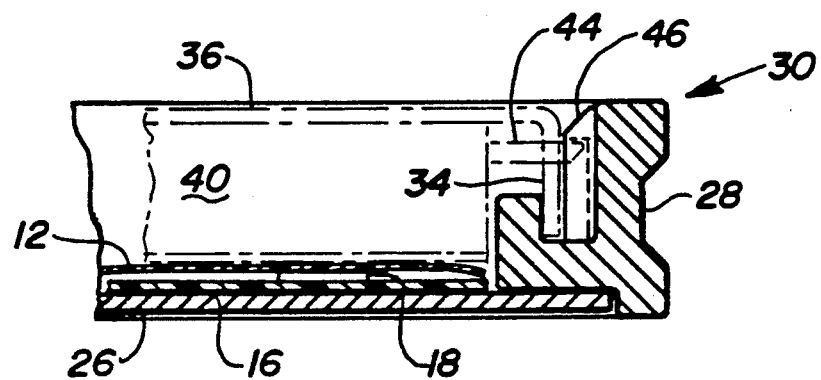
FIG. 4 is an enlarged view of a circled portion of FIG. 3 with an X-ray film placed against one of the screens and the partially opaque label.

Referring to FIGS. 1, 3 and 4, there is illustrated an apparatus 10 for producing a visible image on a sheet 12 of X-ray film identifying a light tight cassette 14 or an intensifying screen 16 used to aid in the exposure of the X-ray film 12. The apparatus 10 comprises a light intensifying screen 16 and means 18 for identifying the intensifying screen 16 on a radiogram exposed to X-rays in the cassette 14 in accordance with the present invention.

The light tight X-ray cassette 14 can be any cassette 14 that can be used to hold a sheet 12 of X-ray film during exposure to X-ray radiation whereby light is released or generated within the cassette 14, such as causing an enclosed screen 16 to fluoresce, as a result of the X-ray radiation to aid in the exposure of the enclosed X-ray film 12. Illustrative cassettes 14 that can be used in the present invention are disclosed in U.S. Pat. Nos. 4,479,232; 4,408,340; 4,380,087; 4,350,248; 4,339,038; 4,264,821; 4,259,586; 4,194,625; 4,166,958; 4,157,474; 4,081,686, 4,032,790; 4,013,890; 3,958,125; 3,884,818; 3,883,746; 3,504,180; and 3,153,145. The present invention can also be practiced in vacuum film holders such as those illustrated by U.S. Pat. Nos. 3,986,035; 3,126,192; and RE 30,045.

For instance, the cassette 14 may comprise a base or frame assembly 20 and a mating cover assembly 22 pivotally connected together, such as, by hinges 24. The base or frame assembly 20 may comprise a base plate 26 connected around its perimeter to a side wall 28. The base plate 26 can be generally square or rectangular. The base plate 26 can be prestressed as described in U.S. Pat. No. 4,081,686, but does not need to be. The side wall 28 can be part of a generally U-shaped channel structure 30 defining a channel 32 adapted to receive, as will be described, an interlocking edge flange 34 of the cover assembly 22 to provide a light-tight cassette 14 as is customary in the prior art.

The cover assembly 22 may comprise a generally flat cover plate 36 with L-shaped edge flanges 34 adapted to enter into the channel 32 of the base assembly 20. The cover plate 36, the base plate 26 and the side wall 28 generally comprise a housing of the cassette 14. A pad 40 of resilient material, such as a polyester foam, is glued or otherwise attached to an inside surface of the cover plate 36.

The cassette 14 typically includes an intensifying screen 16 in the base assembly 20, in the cover assembly 22 or in both the base assembly 20 and the cover assembly 22. FIGS. 1, 3 and 4 illustrate an embodiment of a light tight X-ray cassette 14 with a first intensifying screen 16 of conventional design adhered to an inside surface of the pad 40 and a second intensifying screen 16 of conventional design adhered to an inside surface of the base plate 26. The intensifying screens 16 are adapted to fluoresce thereby generating light in response to exposure to X-ray radiation. The intensifying screens 16 are essentially composed of a support and a fluorescent layer formed thereon. The fluorescent layer is composed of a phosphor, which emits light of high luminance by the excitation of radiation, dispersed in a resinous binder. The fluorescent layer is usually covered with a transparent protective layer.

Conventional latch mechanisms comprising a tongue 44 and means 46 defining a mating slot are secured to the cover assembly 22 and the base assembly 20. The latch tongue 44 may be spring loaded. If so, the latch mechanisms 42 can operate to secure the cassette 14 closed by retracting the latch tongues 44 compressing the springs, inserting the flange 34 into the channel 32, releasing the tongues 44 whereby the tongues 44 are forced by their springs into their mating slots 46. Tabs 48 may extend from the tongues 44 for use in moving the tongues 44 and to facilitate the lifting of the cover assembly 22 from the base assembly 20. See FIG. 7.

Preferably, the base plate 26 and the cover plate 36 are made of aluminum, however, other suitable materials may be used as desired. It will be recognized by those skilled in the art that the base plate 26 should have a low X-ray absorption capability.

Figure 2:
FIG. 2 is an enlarged view of the label illustrated in FIG. 1.

The means 18 for identifying or referencing the cassette 14 and/or the intensifying screen 16 on a radiogram exposed to X-rays in the cassette 14 and or adjacent the intensifying screen 16 can be a label 18 which is at least partially opaque to light. The label 18 may be any shape or size so long as it uniquely identifies the cassette 14 or intensifying screen 16 to which the label 18 is attached. FIG. 2 is an enlarged view of the illustrative label 16 depicted in FIG. 1. The label 18 must be attached, such as, by an adhesive or tape onto an area of one of the intensifying screens 16 which will not interfere with anatomical images to be formed in X-ray film 12 used with the labelled intensifying screen 16. Preferably, the label 18 comprises a flat piece of material, such as a polyester film, with light absorbing portions, such as black colored areas, or translucent portions within light absorbing portions defining alpha and/or numeric characters 50 which are uniquely assigned to a particular cassette 14 and/or an intensifying screen 16 to which the label 18 is attached.

The apparatus 10 of the present invention can be used to perform a process or method for identifying or referencing an X-ray intensifying screen 16 and/or cassette 14 used to produce a radiograph in accordance with the present invention.

The first step of the process comprises placing the label 18 identifying the intensifying screen 16 on the intensifying screen 16 where the label 18 is at least partially opaque to light.

Second, a sheet 12 of X-ray film is placed in the cassette 14 and/or adjacent or against the screen 16 and the label 18. Preferably, the label 18 should be sandwiched between the intensifying screen 16 and the film 12. FIG. 4 is an enlarged view of a circled portion of FIG. 3 with an X-ray film 12 placed against one of the screens 16 and the partially opaque label 18.

Figure 5:
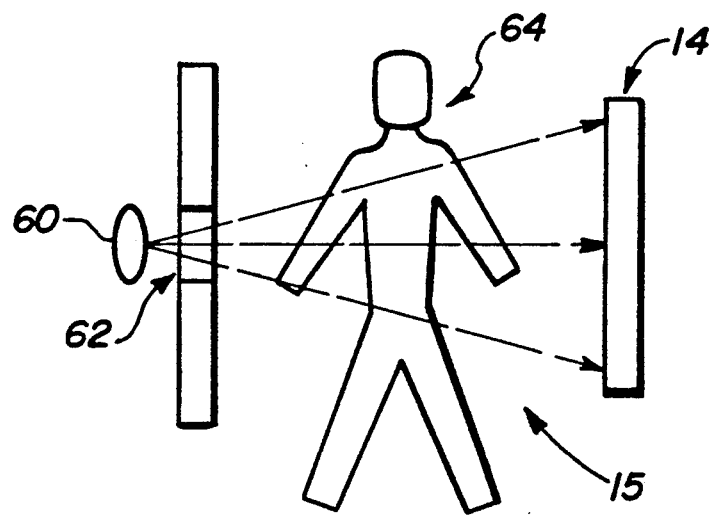
FIG. 5 schematically illustrates exposing the screens, the label and the film to X-ray radiation when the film is in a closed light tight cassette in accordance with the process of the present invention.

Third, as illustrated in FIG. 5, the screen 16, the label 18 and the film 12, all enclosed within the cassette 14, are exposed to X-ray radiation 15. Specifically, FIG. 5 illustrates a X-ray radiation source 60 emitting X-ray radiation 15 through an aperture 62, a patient 64 and then the cassette 14. This causes the screen 16 to fluoresce thereby generating light. Some of the light is absorbed by the label 18 in a unique pattern, such as a pattern that defines a unique set of alpha or numeric characters 50 for the particular screen 16 and/or the cassette 14.

Figure 6:
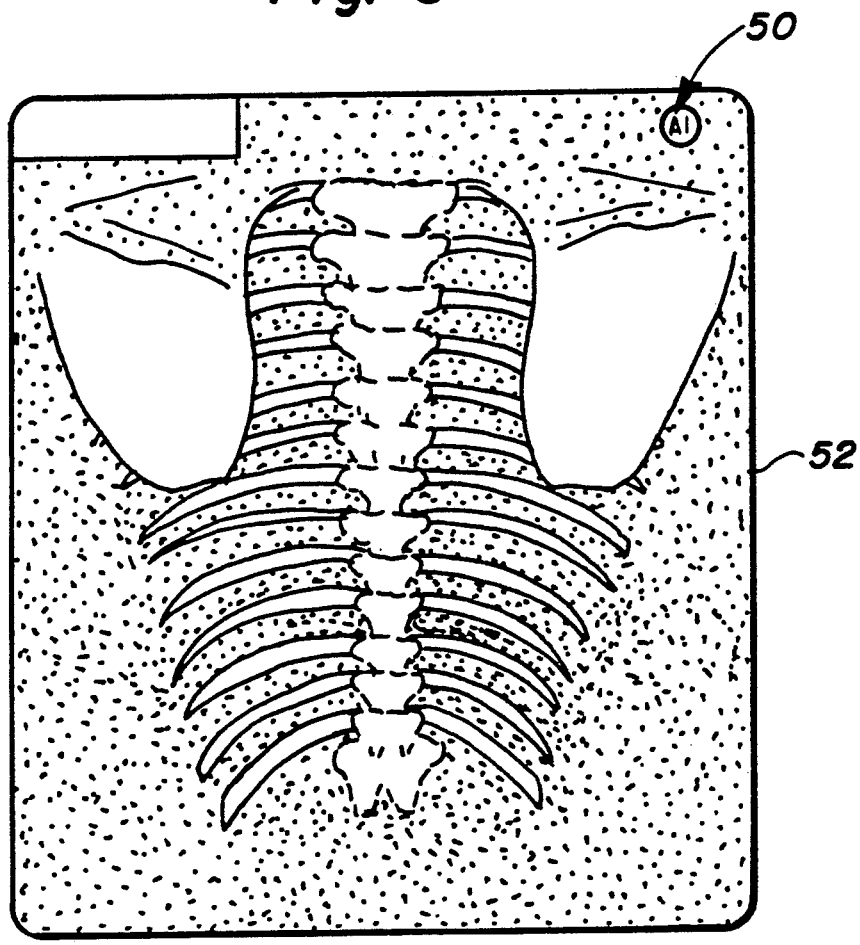
FIG. 6 schematically illustrates a developed film or radiogram with a visible image on the film uniquely identifying the intensifying screen and cassette used in generating the radiogram in accordance with the process of the present invention.

Fourth, the film 12 is developed to produce a visible image on the film 12 of the label 18 identifying the intensifying screen 16 and/or the cassette 14 used. FIG. 6 schematically illustrates a developed film or radiogram 52 with the characters 50 "A1" "printed" on the film 12 in accordance with the process of the present invention.

The label 18 on the intensifying screen 16 can also be used in an automated X-ray film developing processor for another purpose. Sensing means 54 can be located in the processor such that when the cassette 14 is opened the sensing means 54 is positioned to sense the presence or absence of the label 18. The sensing means 54 may include a light emitting sensor. When a sheet 12 of X-ray film is covering the label 18, the sensing means 54 could generate a signal indicating that a sheet 12 of film is present thereby, for instance, allowing the processor to continue to unload the film 12 and develop it. FIG. 3 illustrates such a situation where the partially opaque label 18 is positioned under the sensing means 54 with a sheet 12 of the X-ray film between the sensing means 54 and the label 18. When the label 18 is unobstructed from the sensing means 54, the sensing means 54 could generate a signal indicating that a sheet 12 of film is not present thereby, for instance, stopping the processor from attempting to unload and develop film 12 which is not present.

Figure 7:
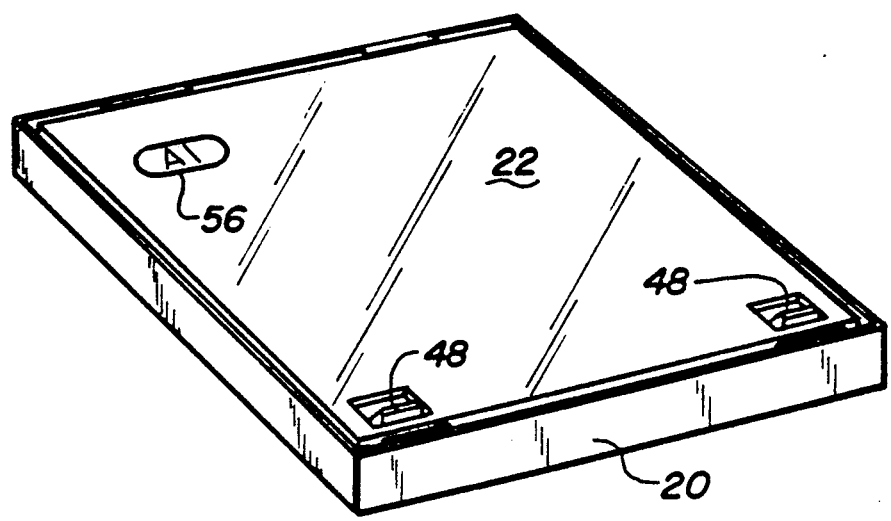
FIG. 7 depicts the light tight cassette in a closed position and marked or labelled to correspond to the identity provided by the label on the screen within the cassette.

The exterior of the cassette housing can be marked or labelled, such as indicated by the reference numeral 56 in FIG. 7, to correspond to the identity established on the label 18 on the intensifying screen 16 in the cassette 14 and on developed film 52 which was exposed within the cassette 14. FIG. 7 depicts the light tight cassette 14 in a closed position and labelled to correspond to the identity provided by the label 18 on the screen 16 within the cassette 14.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. An apparatus for producing a visible image on an X-ray film identifying an intensifying screen used to aid in the exposure of the X-ray film, the apparatus comprising:

at least one intensifying screen adapted to fluoresce when exposed to X-ray radiation;

means for identifying the intensifying screen on a radiogram exposed to X-ray radiation adjacent the screen, the identifying means comprising a label attached to the intensifying screen, the label being at least partially opaque to light and uniquely identifying the intensifying screen to which the label is attached;

a light tight X-ray cassette housing for enclosing the screen adjacent the X-ray film; and a mark or label on an exterior of the cassette housing, the mark or label corresponding to the identity established by the label on the intensifying screen in the cassette and on any developed film which was exposed within the cassette.

2. The apparatus of claim 1, wherein the label is a piece of film with light absorbing portions or translucent portions within light absorbing portions defining alpha and/or numeric areas.

3. The apparatus of claim 1, wherein the light tight X-ray cassette housing encloses two intensifying screens.

4. A method for identifying an X-ray intensifying screen or cassette used to produce a radiograph comprising:

placing a label identifying the intensifying screen on the intensifying screen in the cassette, the label being at least partially opaque to light;

before or after the placing step, marking or labeling an exterior of the cassette to correspond to the identity on the label on, or to be placed on, the intensifying screen;

placing an x-ray film against the screen and the label;

exposing the screen, the label and the film to X-ray radiation; and developing the film to produce a visible image on the film of the label identifying the intensifying screen used.

5. The process of claim 4, wherein the exposing step further comprises:

causing the screen to fluoresce thereby generating light and absorbing the light by the label in a pattern that defines alpha or numeric characters.

6. A method for identifying an X-ray intensifying screen or cassette used to produce a radiograph comprising:

placing a label identifying the intensifying screen on the intensifying screen in the cassette, the label being at least partially opaque to light;

placing an X-ray film against the screen and the label;

exposing the screen, the label and the film to X-ray radiation;

developing the film to produce a visible image on the film of the label identifying the intensifying screen used; and sensing to determine the presence of the label in order to determine whether or not film is adjacent to the screen.

* * * * *